United States Patent Office 3,511,312
Patented May 12, 1970

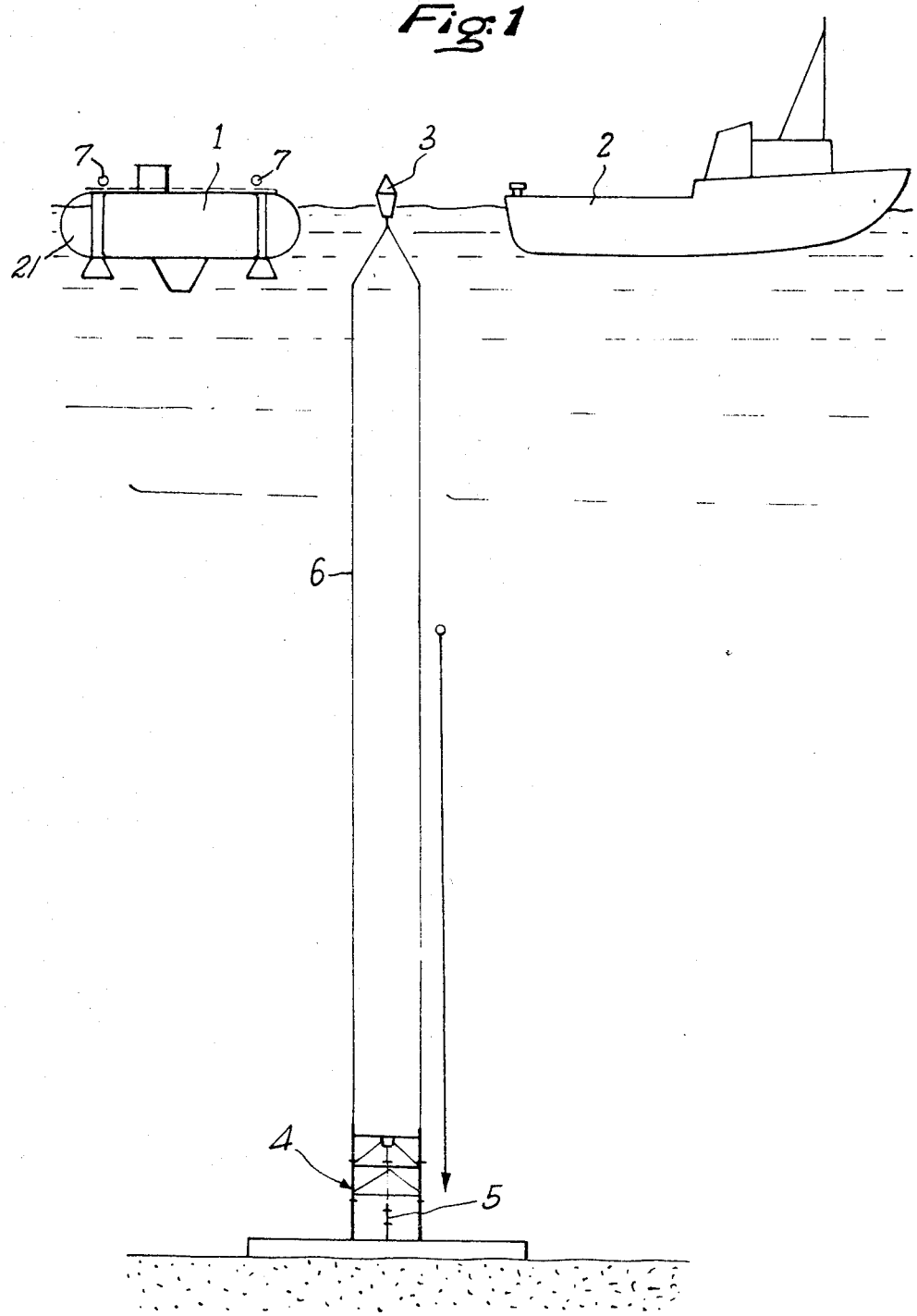

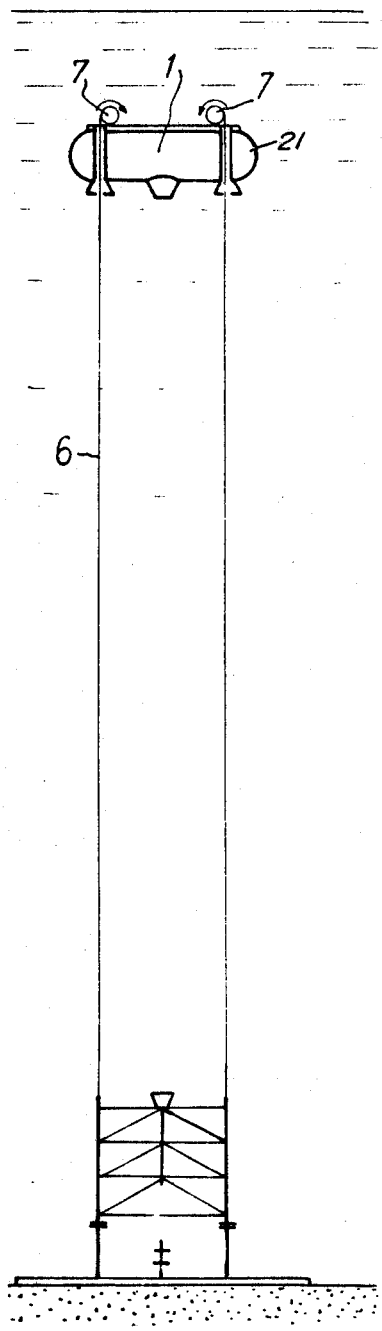
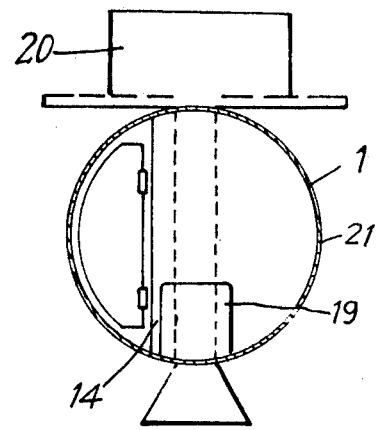

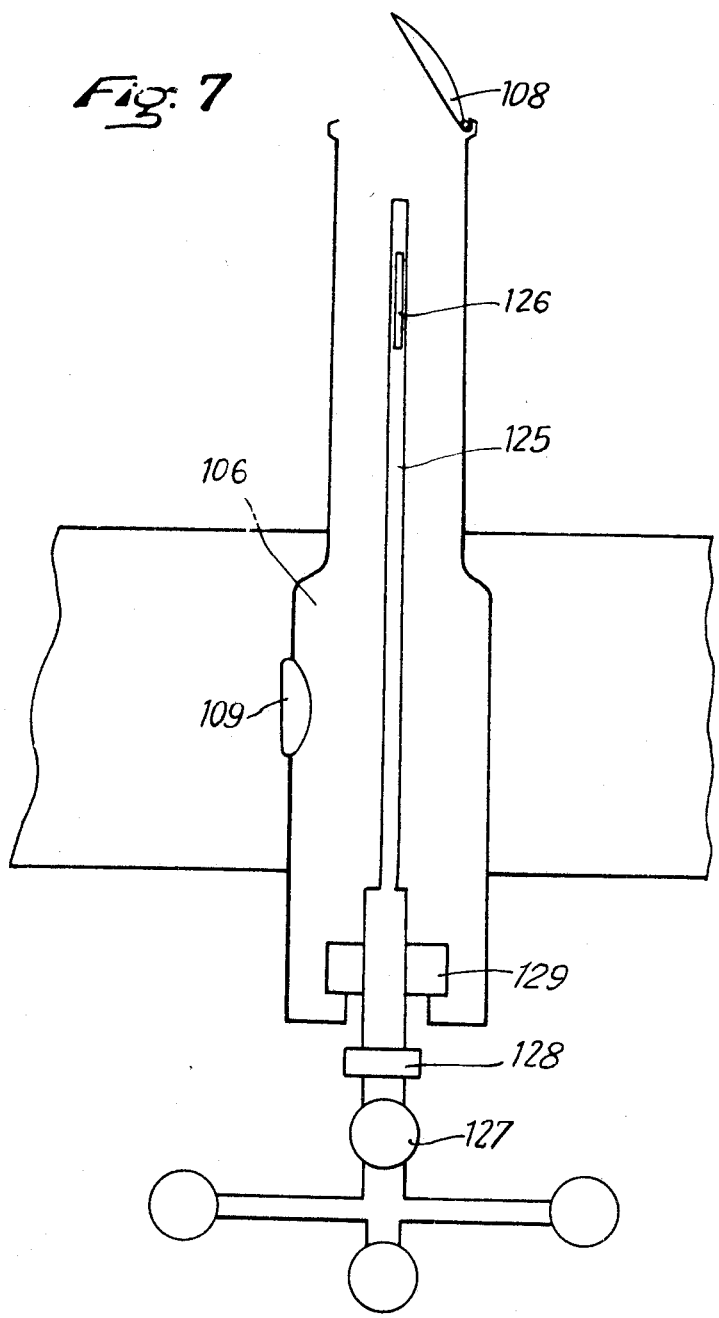

3,511,312
CABLE WORKING ARRANGEMENT ON SUBMARINE WELL-HEADS
Maurice Laffont, 19 Les Engoulvents-Domaine de St. Francois 78, La Celle-St.-Cloud, France, and Claude Duvet, 21 Rue Rollin, Paris, 5 eme, France
Filed Apr. 23, 1968, Ser. No. 723,431
Claims priority application France, Apr. 24, 1967, 103,872; Apr. 9, 1968, 147,515
Int. Cl. E21b 33/035
U.S. Cl. 166—.5                                4 Claims

ABSTRACT OF THE DISCLOSURE

A cable working device for use at the head of a submerged well comprised of a submergible nacelle or vessel capable of positioning at the well-head beneath a body of water for servicing of the well.

BACKGROUND OF THE INVENTION

Field of the invention

The present invention relates to an underwater working arrangement for carrying out, at a pressure close to atmospheric pressure, operations on the heads of submarine wells.

The state of the prior art

It is well known to locate well-heads on the bottom of the sea, said heads forming the ends of the columns lowered into the drilled wells, permitting at the same time the suspension of the columns and the control of the rates of flow of the fluids leaving the wells.

These well-heads are mainly employed for petroleum drillings. They are formed of an assembly of connecting clamps, valves, and possibly nozzles which permit the flow of fluids leaving the wells to be channeled and regulated. While these well-heads are generally of a type similar to those used on dry land, improvements which permit quick connection with the different elements of the wells are normally employed. Such quick connection improvement having the effect of reducing to the maximum degree the time required for work by humans at the well-heads.

The cable working method employed herein is that used on land. This method, the object of which is to effect various operations in the petroleum wells, consists of introducing a special tool in a lock chamber equipped with valves and suitable devices, said tool being suspended from a preferably smooth cable; subjecting this cable to different maneuvers by which it is possible for different operations to be carried out inside the well by means of the tool which is connected to the said cable, such as, for example, the closing of safety valves located at the base of the production columns, or various other operations.

The difficulty arising with cable working on the submarine wells stems from the fact that the operations so far carried out on land must be undertaken by divers, who are only able to remain at work for a short time. The operations are then very costly and sometimes impossible.

The present invention has for its object to obviate this difficulty by making possible the work to be undertaken under atmospheric pressure by operators enclosed in a fluid-tight nacelle.

SUMMARY OF THE INVENTION

The arrangement according to the present invention is formed by a fluid-tight nacelle comprising a main compartment which is maintained under a pressure close to atmospheric pressure, ballast tanks and releasable weights, a lock chamber fast with the nacelle, which chamber is provided at its lower part with a sealing device adapted to be applied to a tube or pipe of the well-head by hydraulic or pneumatic means controlled by the crew of the nacelle.

According to one feature of this arrangement, the nacelle is equipped with winches permitting a traction to be applied from the nacelle on cables anchored to a fixed structure at the well-head, the nacelle being provided with guides which permit it to be positioned on the said fixed structure.

In one preferred embodiment, the arrangement according to the present invention is formed by a fluid-tight nacelle, in which the pressure is close to atmospheric pressure, said nacelle being provided with ballast tanks, releasable weights and caissons which can be filled with sea water, said nacelle further comprising a working lock chamber of large dimensions fast with the nacelle, said lock chamber serving as a working compartment during phases when the crew is attending to the mounting of the high-pressure lock chamber and the working tools on the cable, said lock chamber having at its lower part a sealing arrangement which can be locked onto a tube of the well-head by hydraulic, pneumatic or mechanical means, controlled from inside the nacelle and, at its upper part, a closure device of large cross-section which can be operated from inside the nacelle.

In this embodiment, the lock chamber has a length sufficient to contain the high-pressure tubular lock chamber which is mounted on the well-head. In this way, the nacelle is able to transport with it the high-pressure lock chamber so that it can be fixed on the well-head at the time of an operation.

Moreover, during the actual cable working operations, the working lock chamber is full of water and open to the sea in its upper part. For this reason, in the event of an eruption, the nacelle is not subjected to the action of the fluids leaving the well and it can safely remain in position, enabling the crew to take those measures in their power for controlling the well.

The nacelle can be provided with ballasting of a large weight, assuring its stability on the structure surrounding the well-head, regardless of the sea currents existing at the places where the work is being carried out.

The nacelle also comprises a releasable compartment in which the crew can take their positions when necessary.

In the description, the lock chamber which is fast with the nacelle and provided with a sealing device, will be called the working chamber. Similarly, the tube which is fixed on the well-head and permits the introduction of the cable working tools will be called the high-pressure tubular chamber.

It is an important object of this invention to alleviate the aforementioned difficulties in the art by providing a new and improved device for use in servicing submerged wells.

As a further object, such a device is provided in the form of a submersible nacelle capable of carrying specialists in cable working operation to the well-head eliminating the problems attendant the utilization of diving specialists for this work.

It is also an object of this invention to provide such cable working specialists with working conditions at submerged well-heads sufficiently similar to such conditions on land as not to inhibit their work.

It is also an important object of this invention to provide such a device wherein the high-pressure tube or chamber from the well is positioned such that effect of an eruption of the well during the cable working operation will not endanger the personnel in the nacelle while also conveniently locating the high-pressure tube or chamber relative to said personnel to facilitate the cable working operation.

Other objects and advantages of the novel features of this invention will become apparent from the following description taken in connection with the accompanying drawings wherein embodiments of this invention are set forth by way of illustration and example. It is, however, expressly understood that the drawings are for the purpose of illustration only and are not intended to define the limits of the invention. Further, the drawings merely illustrate a preferred embodiment incorporating the features of this invention.

DESCRIPTION OF THE DRAWINGS

FIG. 1 is a schematic view showing the towing of a nacelle, embodying the features of this invention, on the surface of the sea.

FIG. 2 is a schematic view showing the descent of the nacelle.

FIG. 4 is a vertical sectional view through the low-pressure chamber.

FIG. 7 is a schematic view showing the nacelle of FIG. 5 in operation an a well-head.

DETAILED DESCRIPTION OF THE PREFERRED EMBODIMENTS

Figure 3:
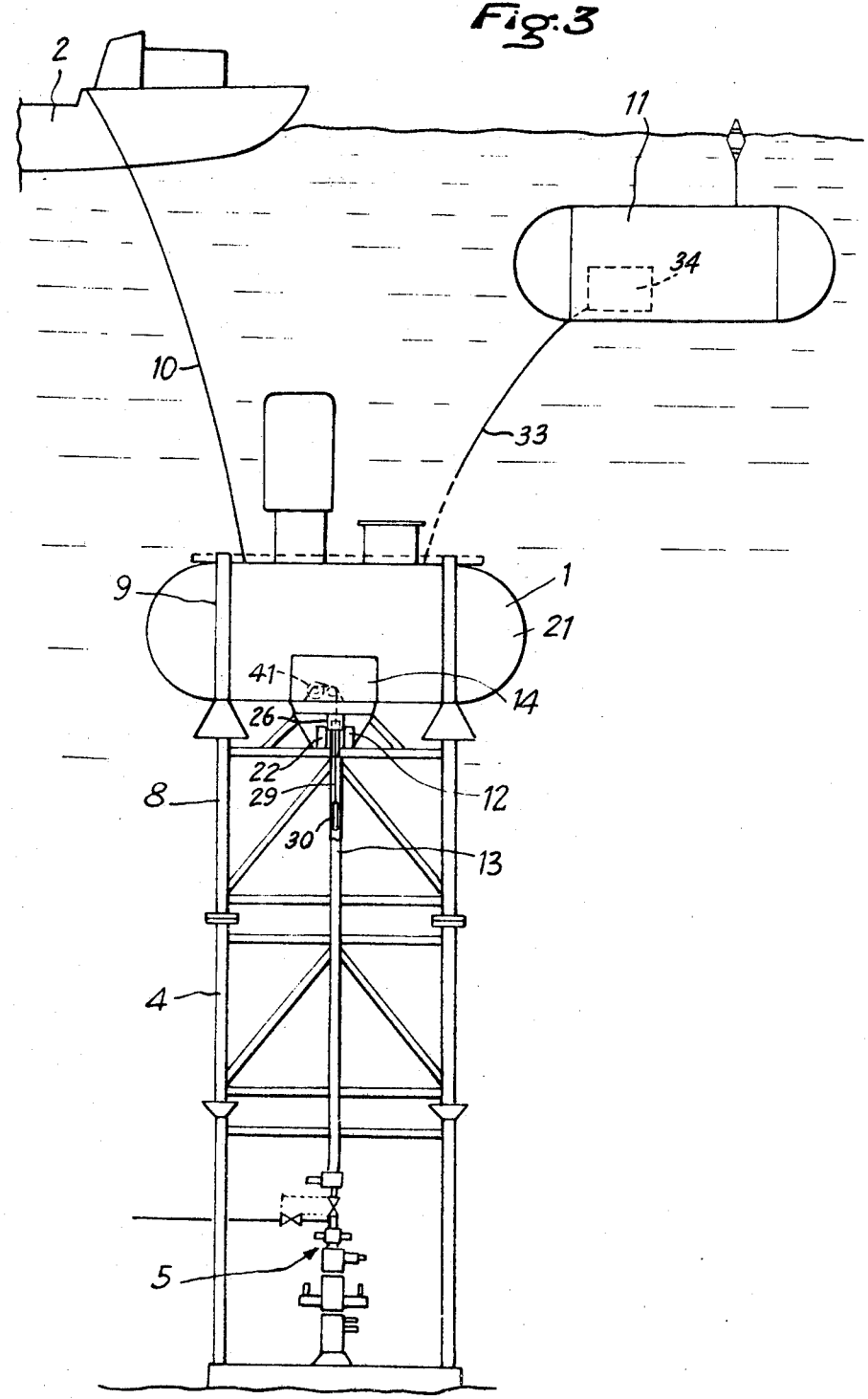
FIG. 3 is a schematic view showing the positioning of the nacelle on the structure surrounding the submarine well-head.

Referring to FIG. 1, the reference 1 indicates a nacelle, which has been towed to sea by means of a ship 2. On reaching the proximity of a buoy 3 connected by cables 6 to the structure 4 surrounding the well-head 5, the nacelle is released from the ship and the guide cables 6 are fixed on the winches 7 in a conventional manner. The winches 7 are mounted in a conventional manner on the nacelle 1.

FIG. 2 shows the descent of the nacelle 1, as guided by the cables 6; a traction is imposed on these cables by means of the winches 7 imparting to the said nacelle a vertical downward movement, although the nacelle has a positive buoyancy of 2 to 3 tons.

FIG. 3 shows the nacelle having arrived at the structure 4 surrounding the well-head 5. The nacelle is positioned on the anchoring uprights 8, which extend into the conduits 9 mounted on the nacelle 1 and are provided for this purpose. The ballast tanks of the nacelle 1 are filled in such a way that the nacelle 1 has an apparent weight lower than the ballest load. The winches are then disengaged so that the nacelle 1 can rise to the surface by a simple discharge of ballast in the event of an accident. The ballast tanks or caissons 110, illustrated in FIGS. 5 and 6, may be used in the nacelle 1. The nacelle 1 is connected by a supply cable 10 to an accompanying ship and possibly to an auxiliary unit 11 for supply of the energy and air necessary for carrying out the proposed operations.

The operators occupying the nacelle 1, who are under atmospheric pressure, then maneuver the sealing device 12 which is to fit over the high-pressure chamber 13 which will hereinafter be described. After the sealing action has been obtained between the said tube and the device 12, the low-pressure chamber 14 is opened and placed in communication with the sea. While the low-pressure chamber 14 may take various forms, it may be similar to that illustrated as chamber 106 in FIGS. 5 and 6. Similarly, various types of sealing devices 12 may be utilized, for instance, seal 129 illustrated in FIGS. 5 through 7 may be employed.

FIG. 4 represents a section of the nacelle opposite the low-pressure chamber. The casing or hull of the nacelle 1 is seen at 21, while 14 is the low-pressure chamber which is separated by a port 19 from the interior of the nacelle. A bridge on the nacelle is provided at 20 enabling the operators to obtain access to the nacelle 1 when the latter is floating on the surface of the sea.

The positioning of this arrangement is as follows:

The accompanying ship 2 tows the nacelle 1, which floats normally, to a point marked by the buoy 3, which supports the guide cable 6 fixed on the structure 4 surrounding the well-head. Having arrived at the place of operation, the operators take their positions inside the nacelle 1 and the operation of connecting the cables wound on the winches 7 to the cables fast with the guide structure is carried out. At this moment, the ballast tanks are partially filled, enabling the nacelle to have a very low buoyancy. By pulling on the cables, the nacelle descends and, guided by these latter, arrives at a position above the structure on which it is to be positioned, the tubes 8 of the structure passing into the interior of the guides 9 which are fast with the nacelle 1. A flexible hose connects the nacelle to the accompanying ship, thereby permitting the nacelle 1 to be supplied with energy and fluids.

Once the nacelle 1 is in position on the fixed structure, the ballast tanks are filled in such a way that the apparent weight of the nacelle is lower than the weight of the releasable ballast. The sealing device 12 then surrounds the lock chamber tube 13; this device 12 is maneuvered by oil being injected under pressure, for example, into the jaws 22. This oil is stored in a pressure accumulator 34.

The low-pressure chamber is then completely closed and the interior of this chamber is under a hydrostatic pressure corresponding to the immersion depth of the nacelle. It is then possible to open the port 19 after decompression of the chamber by means of a cock (not shown).

The tool 30 is then introduced into the high-pressure tubular chamber 13, this chamber being closed at its bottom end by a valve (not shown). The element 26 is then screwed on the tube 13 and the port 19 is closed again; by means of the pressure accumulator 34, pressure is supplied to the control device of the valves producing the connection between the high-pressure chamber 13 and the interior of the well, the control being assured by the oil under pressure supplied by the conduit 33.

The tool 30 is then allowed to descend into the well under the action of its own weight, the tool remaining attached to the cable 29 which unwinds from a drum of a winch 41.

The lifting of the tool is carried out in the reverse manner and when the tool comes into the high-pressure chamber, the port 19 is opened after decompression and the fluids contained in the tube 13 are driven off, the element 26 is unscrewed and thus the tool assembly is lifted again.

The tube 13 is then closed again by means of a solid plug. Finally, the port 19 is again closed and the device 12 is opened. A part of the water in the ballast tanks is then released and, while controlling the tension of the guide cables 6, the nacelle is able to rise again because of its own buoyancy. In the event of an accident, the crew can take up a position in a releasable compartment placed above the nacelle, which compartment can be released from the latter very quickly, this compartment having a very positive buoyancy.

Figure 5:
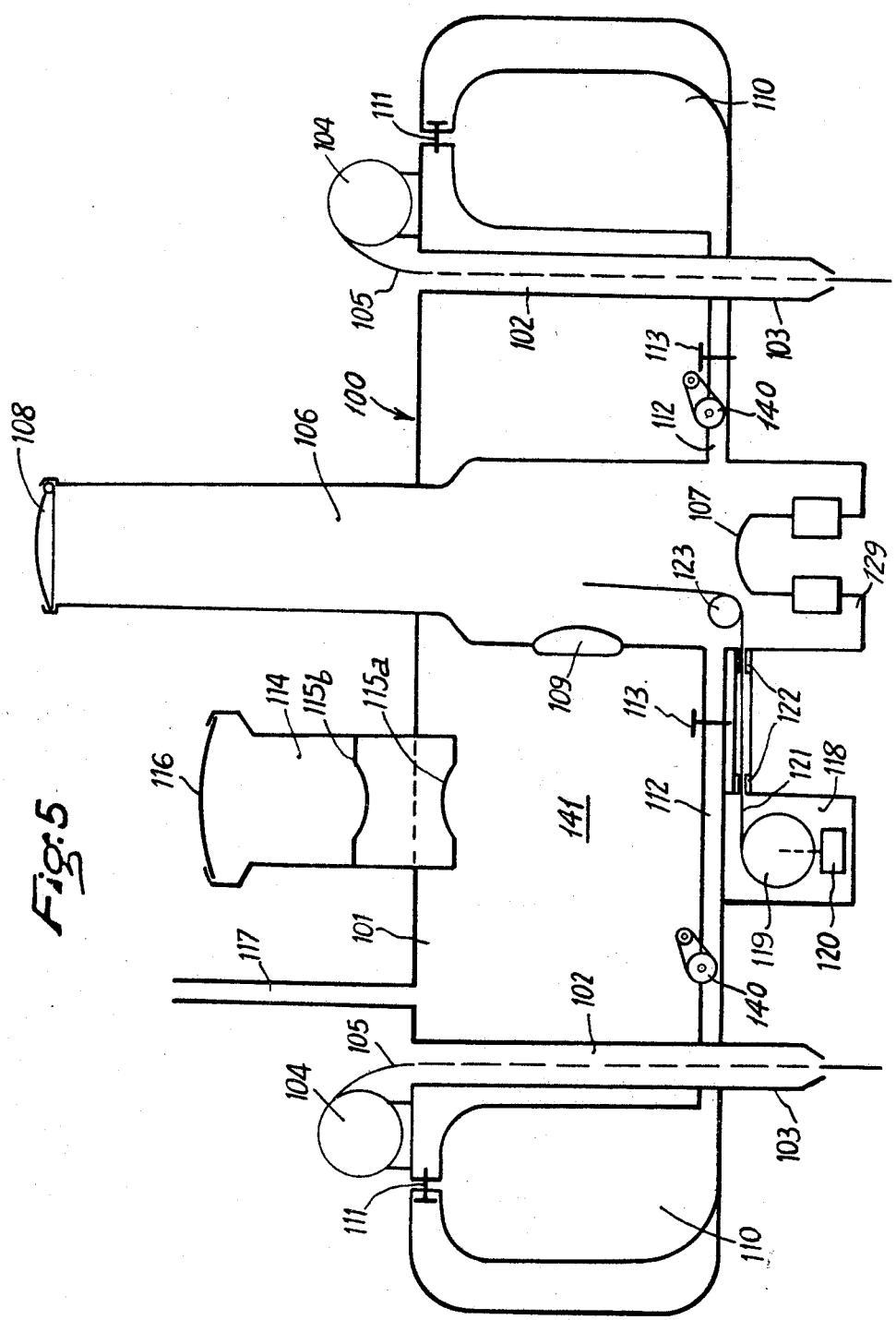
FIG. 5 is a schematic view showing a modified type of nacelle embodying the features of this invention.

In FIG. 5, a modified embodiment of a nacelle is illustrated and designated by the reference numeral 100. The reference 101 represents the body or hull of the nacelle, which has an elongated tubular form. In one embodiment, this nacelle has, for example, a length of 10 metres and a diameter of 2½ metres. Formed in the body of the nacelle 100 are two guide tubes 102 which are symmetrical in relation to the plane of symmetry of the nacelle and perpendicular to the axis of the latter. These guide tubes are extended below the nacelle 100, as indicated at 103. These tubes 103 are adapted to position the nacelle 100 on the solid structure of the well-head. Positioned in the vicinity of the tubes 102 are two winches 104, onto which are wound cables 105. These winches exert a traction by means of the cables 105, fixed beforehand to the structure which is fast with the well-head. These winches 104 permit a vertical traction to be exerted, so as to cause the nacelle 101 to descend, as previously described in relation to nacelle 1. At 106, there can be seen the working chamber, which can be closed in the rest position by a door 107 in its lower part and is provided with an automatically opening door 108 in its upper part. A door 109 permits the crew in the body 101 of the nacelle to have access to the chamber.

Caissons 110 are placed at each end of the nacelle 106. These caissons have a volume equal to that of the compartment referred to as working chamber 106 and can be brought into communication with it by the conduits 112 and cocks 111 and 113. In this manner, the water contained in the chamber 106 can be transferred by pumping into the caissons 110 and vice versa; in this way, heavy compressed air consumption is avoided and the apparent weight of the nacelle is constant. Whether chamber 106 is filled with water or air. The pumping is effected in a conventional manner by pumps 140 which are conventionally coupled in conduits 112.

The arrangement is completed by a releasable compartment 114. Access to this releasable compartment 114 from the interior of the cabin or atmospheric chamber 141 is by way of two doors 115a and 115b defining a safety compartment and permitting the nacelle 100 to be evacuated without being filled by the sea or other surrounding liquid. The door 115b is, of course, mounted on the compartment 114, which is also provided with an upper door 116 which can be opened when the compartment 114 is on the surface of the sea. Compartment 114 is releasably mounted to the hull 101 by conventional releasable mountings and is adaptable for release by activation of a release control within the compartment 114 such that the compartment 114, having a high buoyancy, will float to the surface independently of the nacelle upon release therefrom.

A nest of tubes 117 serves to supply the cabin 141 with air, fluids and electric power and to evacuate towards the surface the ventilation air of the chamber.

The cable winding winch 119 which serves for the working operations on wells is arranged in a chamber 118 placed beneath the occupied nacelle and to which access is possible from inside the latter. The winch is driven by a motor 120. The working cable is wound onto the winch drum, this being a usual smooth or twisted cable 121 which passes through stuffing boxes or equivalent devices 122 over a set of pulleys 123 and 124 before entering the high-pressure tubular lock chamber 125.

Figure 6:
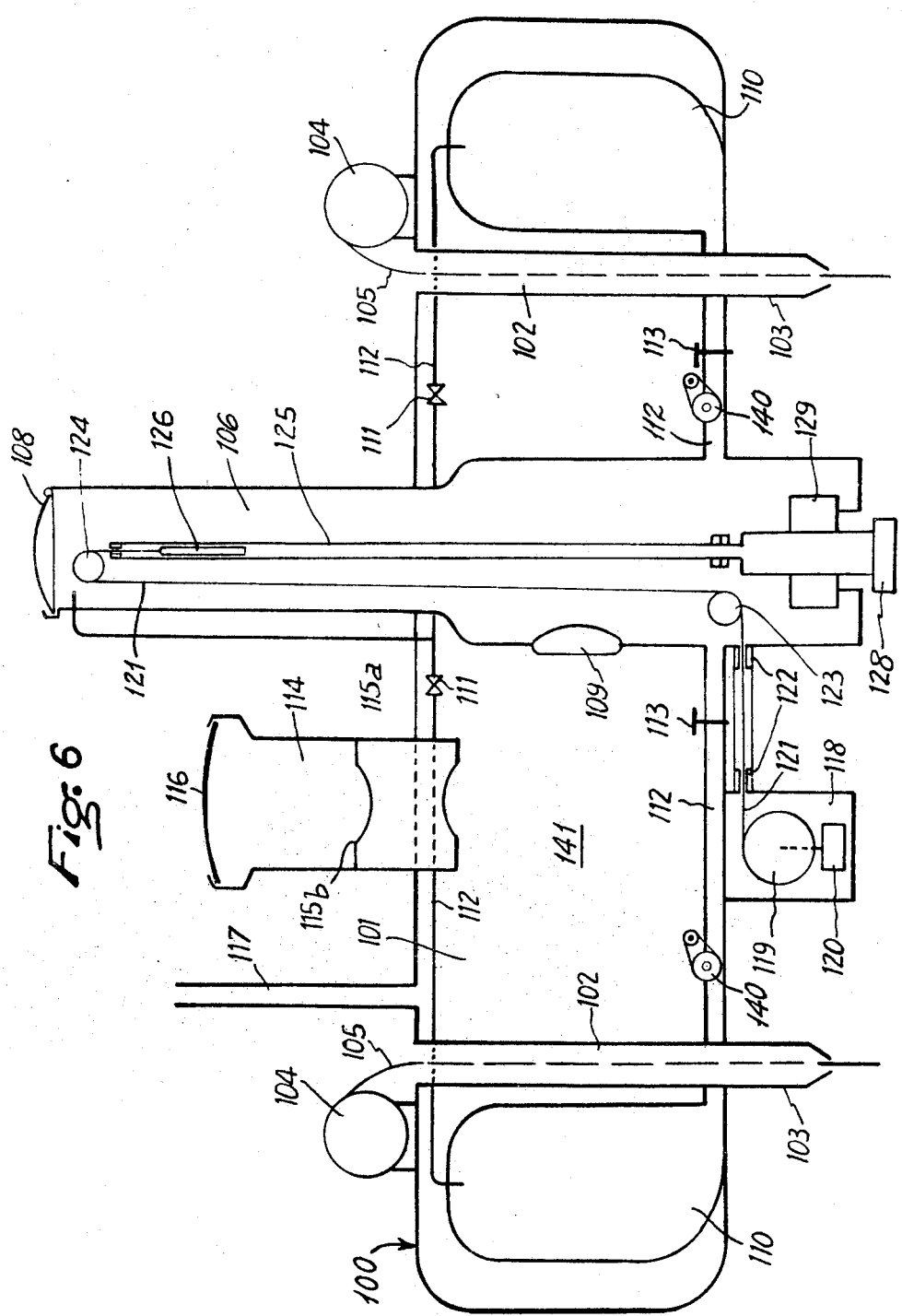
FIG. 6 is a schematic view showing the nacelle of FIG. 5 provided with a high-pressure tubular chamber.

In FIG. 6, the nacelle described in FIG. 5 carries with it the high-pressure tubular lock chamber 125 enclosed in the working chamber 106, the sealing action being obtained by closing on the high-pressure chamber the sealing device 129. By maneuvering the nacelle 100, it is possible to connect the base 128 of the high-pressure chamber on the fixed well-head. A pulley 124 is fixed on the tube 125 and a tool 126 is connected to the cable 121. The operation of the arrangement is as follows:

After having positioned the chamber on the well, as indicated above, the two caissons 110 are filled with water, this having the effect of making the nacelle heavier and of supporting it, so that it withstands the influence of the submarine currents.

FIG. 7 shows the chamber in the working position on the well-head 127.

The working chamber 106 is filled with water by pumping into the chamber 106 the water contained in the caissons 110. The high-pressure tubular chamber 125 is freed by opening the sealing device 129 and placed in position on the well by a handling device (not shown). The sealing device 129 is then closed again. Water is then pumped from the chamber 106 into the caissons 110. It is then possible to enter the compartment 106 through the door 109. the tools 126 for working on the well can then be introduced by the crew into the tubular chamber 125, the upper part of which can be disconnected; thereafter, the door 109 is closed and the compartment 106 is once again filled with water. The door 108 is then opened. The crew can then carry out the cable working operations in the same manner as on earth, by operating the winch 119 as described above.

During all the operations, the high-pressure tubular chamber 125 does not suffer any stress caused by the chamber 106 and only supports the internal pressure due to the well fluids and the cable traction, under the same conditions as on earth.

During the cable working operation, the door 108 is kept open. On completing the operation, the well is closed and the door 108 is closed. The water of the chamber 106 is delivered into the caissons 110 and the tubular chamber 125 is decompressed through orifices (not shown). If a small quantity of water remains in the chamber 106, it is forced into the sea by a pump (not shown).

After checking the seals, the crew can enter the chamber 106 and once again work under atmospheric pressure on the high-pressure tubular chamber for extracting the working tools.

It is to be understood that the form of the invention herein shown and described is to be taken as a preferred example of the invention and various changes and modifications in the arrangement of parts and the interconnection of components may be resorted to without departing from the spirit of the invention or the scope of the appended claims. All such variations and modifications which come within the spirit and scope of the appended claims are intended to be included herein as fully and completely as if they had been specifically illustrated, described, and claimed. Thus, the modifications specifically disclosed are exemplary only and are not intended to be limiting on the scope of the invention. The scope of the invention is defined by the following claims:

What is claimed is:

1. A cable working device for use at the head of a submerged well comprising a submersible nacelle including:
   (a) a submersible hull defining an atmospheric chamber, a working lock chamber and at least one caisson;
   (b) means defining an opening to provide communication between said atmospheric chamber and said working lock chamber including a watertight closure means for selectively closing said opening;
   (c) means operatively coupled to said atmospheric chamber for maintaining said chamber, substantially at atmospheric pressure;
   (d) liquid-tight means mounted at the lower end of the working lock chamber for effecting a liquid tight connection between the lock chamber and a pipe on said well-head;
   (e) means for effecting the controlled flow of water between the caisson and the working lock chamber;
   (f) means operatively mounted on said hull and at least in part positioned in said working lock chamber for operating a cable to permit reciprocal movement of a tool through said pipe of the well-head and the well bore;
   (g) ballast means associated with said hull for providing replaceable ballasts to selectively vary the apparent weight of the nacelle and maintain the stability of the nacelle.

2. A device as recited in claim 1 wherein said working lock chamber includes a closure member at its upper portion selectively operable to an open position to permit the ingress of the liquid surrounding the hull to the working lock chamber.

3. A device as recited in claim 1 wherein the working lock chamber is of a length sufficient to receive a high-pressure tubular lock chamber which is attached to the well-head.

4. A device as recited in claim 1 including a releasable cell mounted on said hull, said hull defining an opening therethrough for communication between said cell and the atmospheric chamber in said hull and a first closure means for sealing said hull opening, said cell defining an opening providing communication between the exterior and the interior of said cell and having a second closure means for sealing said cell opening.

References Cited

UNITED STATES PATENTS

| | | | |
|---|---|---|---|
| 3,063,507 | 11/1962 | O'Neill et al. | 166—.5 |
| 3,294,185 | 12/1966 | O'Neill et al. | 166—.5 |
| 3,353,364 | 11/1967 | Blanding et al. | 166—.5 |
| 3,202,217 | 8/1965 | Watts et al. | 166—.6 |
| 3,391,734 | 7/1968 | Townsend | 166—.5 |

FOREIGN PATENTS 160,865  4/1921  Great Britain.

JAMES A. LEPPINK, Primary Examiner

U.S. Cl. X.R.

175—8